US007080146B2

(12) United States Patent
Bradford et al.

(10) Patent No.: US 7,080,146 B2
(45) Date of Patent: Jul. 18, 2006

(54) METHOD, APPARATUS AND COMPUTER PROGRAM PRODUCT FOR WORKLOAD BALANCING AMONG MULTIPLE COMMUNICATION OF PATHS TO A PLURALITY OF DEVICES

(75) Inventors: Barry Lynn Bradford, Broomfield, CO (US); Mark C. Briel, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 101 days.

(21) Appl. No.: 10/799,172

(22) Filed: Mar. 12, 2004

(65) Prior Publication Data

US 2004/0174888 A1    Sep. 9, 2004

Related U.S. Application Data

(63) Continuation of application No. 09/453,657, filed on Dec. 3, 1999, now Pat. No. 6,728,770.

(51) Int. Cl.
    *G06F 13/00* (2006.01)
(52) U.S. Cl. ............... 709/226; 709/224; 709/238; 718/105
(58) Field of Classification Search ........ 709/218, 709/219, 223, 224, 225, 226, 232, 235, 238; 718/104, 105
    See application file for complete search history.

(56) References Cited

U.S. PATENT DOCUMENTS 4,403,286 A     9/1983  Fry et al. .............. 364/200
5,239,649 A *   8/1993  McBride et al. ......... 718/105
5,313,584 A *   5/1994  Tickner et al. .......... 710/37
5,799,173 A     8/1998  Gossler et al. .......... 395/500
6,006,259 A *  12/1999  Adelman et al. ........ 709/223

(Continued)

FOREIGN PATENT DOCUMENTS

EP           0892531         1/1999

OTHER PUBLICATIONS

Colajanni et al., "Analysis of Task Assignment Policies in Scalable Distributed Web-Server Systems", IEEE Transactions on Parallel and Distributed Systems, vol. 9, No. 6, Jun. 1998, pp. 585-599.

(Continued)

*Primary Examiner*—Viet D. Vu
(74) *Attorney, Agent, or Firm*—Yee & Associates, P.C.

(57) ABSTRACT

An apparatus and method for workload balancing along multiple communication paths to a plurality of devices. The apparatus includes a controller that accumulates path usage information and a path balancing device that makes use of the accumulated path usage information to perform a path balancing operation. The path balancing method involves the path balancing device calculating the total expected connect time for all I/O messages issued to each of a plurality of peripheral devices during a predefined sampling period. These totals are then added for each communication path for the sampling period to obtain path totals. The path totals are then compared to see if a difference between the highest used path and the lowest used path is greater than a threshold amount. If the difference is higher than the threshold amount, the peripheral device having a total expected connect time that is closest to a target value is moved from the highest used path to the lowest used path.

32 Claims, 5 Drawing Sheets

U.S. PATENT DOCUMENTS

| | | | |
|---|---|---|---|
| 6,167,427 A | 12/2000 | Rabinovich et al. | 709/201 |
| 6,259,705 B1 * | 7/2001 | Takahashi et al. | 370/465 |
| 6,317,808 B1 | 11/2001 | Berenshteyn | 711/112 |
| 6,393,458 B1 | 5/2002 | Gigliotti et al. | 709/203 |
| 6,434,637 B1 | 8/2002 | D'Errico | 710/38 |
| 6,629,148 B1 * | 9/2003 | Ahmed et al. | 709/238 |

OTHER PUBLICATIONS

IBM Technical Disclosure Bulletin, Aug. 1981, vol. 23, No. 3, "I/O Load Balancing Using Device Connection Timings", p. 1411.

* cited by examiner

METHOD, APPARATUS AND COMPUTER PROGRAM PRODUCT FOR WORKLOAD BALANCING AMONG MULTIPLE COMMUNICATION OF PATHS TO A PLURALITY OF DEVICES

This application is a continuation of application Ser. No. 09/453,657, filed Dec. 3, 1999, now U.S. Pat No. 6,728,770.

BACKGROUND OF THE INVENTION

1. Technical Field

The present invention is directed to a path balancing apparatus and method. In particular, the present invention is directed to an apparatus and method for workload balancing along multiple communication paths to a plurality of devices.

2. Description of Related Art

Systems are known in which multiple peripheral devices may be accessed by processing devices via multiple communication paths. Multiple processing devices may access the peripheral devices over the same communication path. Thus, some of these communication paths may be more utilized than others leading to an imbalance in the workloads for the communication paths. This situation may lead to a loss in throughput of the overall system.

As a solution to this problem, the known systems require the peripheral devices to be manually configured or new peripheral devices to be added to the system to compensate for the imbalance in workloads. However, this solution has proven unsatisfactory in that the workloads of the communication paths do not become adequately balanced.

Thus, a need is present for new technology to provide an apparatus and method for balancing workloads across a plurality of communication paths.

SUMMARY OF THE INVENTION

The present invention provides an apparatus and method for workload balancing along multiple communication paths to a plurality of devices. The apparatus includes a controller that accumulates path usage information and a path balancing device that makes use of the accumulated path usage information to perform a path balancing operation.

The path balancing method of the present invention involves the path balancing device calculating the total expected connect time for all I/O messages issued to each of a plurality of peripheral devices during a predefined sampling period. These totals are then added for each communication path for the sampling period to obtain path totals. The path totals are then compared to see if a difference between the highest used path and the lowest used path is greater than a threshold amount. If the difference is higher than the threshold amount, the peripheral device having a total expected connect time that is closest to a target value is moved from the highest used path to the lowest used path.

In this way, the lowest used path will receive more I/O messages while the highest used path will receive less I/O messages. Over a number of iterations, the difference between the highest use path and the lowest used path should fall below the threshold amount and the system will be well balanced.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
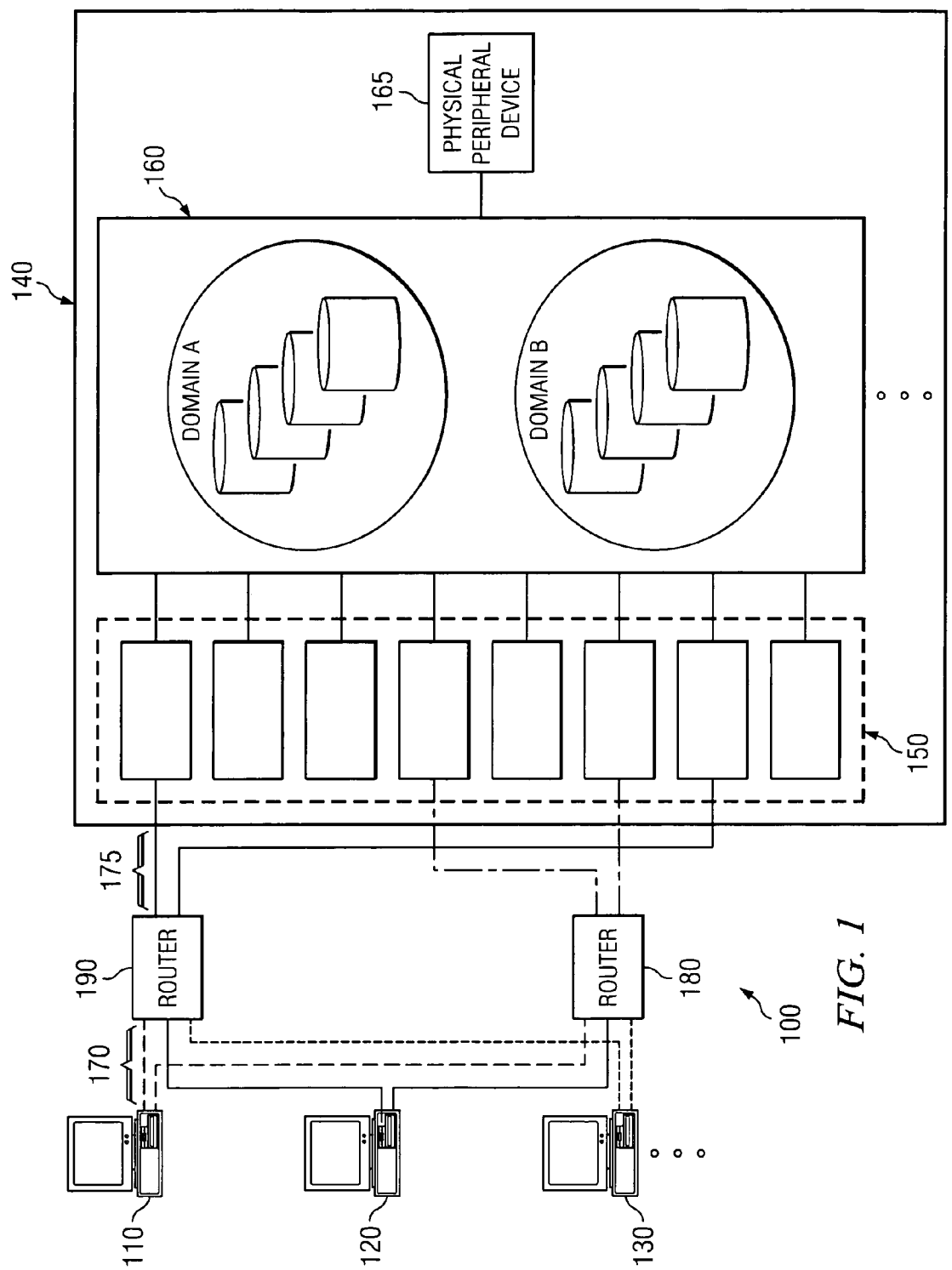
FIG. 1 is an exemplary diagram of a multiple path system in which the present invention may be implemented.

FIG. 1 is an exemplary diagram of a multiple path system 100 in which the present invention may be implemented. As shown in FIG. 1, the system 100 includes open system devices 110, 120 and 130, routers 180 and 190, and a shared virtual array 140 of virtual peripheral devices 160 representing at least one physical peripheral device 165. The shared virtual array 140 further includes a plurality of interface devices 150 for providing a communication gateway between the open system devices 110, 120 and 130 and the plurality of virtual peripheral devices 160.

The open system devices 110, 120 and 130 may be, for example, devices that provide interoperability between hardware and software that is defined by the industry at large and not only by a select few vendors. For example, the open system devices 110, 120 and 130 may be UNIX-based devices, personal computers, database management systems (DBMSs) that run on many different platforms, or any other tools that may be used across multiple platforms.

The shared virtual array 140 is an array of virtual peripheral devices 160 that may be accessed by the open system devices 110, 120 and 130. The shared virtual array 140 is "virtual" in that each physical peripheral device 165 in the shared virtual array 140 may be represented as a plurality of virtual devices. For example, if the physical peripheral device 165 is a storage device having a storage capacity, through compaction and compression methods, the amount of used storage space may be decreased and thus, the storage capacity effectively increased without actually increasing the size of the storage device. In this way, a single physical storage device may be represented as a plurality of virtual storage devices to the open system devices 110–130.

The physical peripheral device 165 may be any type of device connected to the open system devices 110, 120 and 130. For example, the physical peripheral device 165 may be a disk drive, a hard drive, a CD-ROM drive, a magnetic tape drive, a monitor, a printer, a database device, and the like. Any type of device that may be utilized by a plurality of open system devices 110–130 may be used as a physical peripheral device 165 without departing from the spirit and scope of the present invention.

The virtual peripheral devices 160 which represent the physical peripheral device 165 may be grouped into domains, such as Domain A and Domain B in FIG. 1. Each open system device 110–130 may be provided access to virtual peripheral devices 160 in certain domains and not in other domains. Thus, although the communication links 170 and 175 from each open system device 110–130 may be capable of communicating with each virtual peripheral device 160 in the shared virtual array 140, the actual virtual peripheral devices 160 that may be communicated with may be restricted by the domain structure.

The shared virtual array 140 further includes a plurality of interface devices 150 through which the open system devices 110–130 communicate with the virtual peripheral devices 160. The interface devices 150 may be any type of device that provides a communication gateway through which communication between the open system devices 110–130 and the virtual peripheral devices 160 may be accomplished. For example, the interface devices 150 may be an ESCON (Enterprise Systems CONnection) interface, a Small Computer System Interface (SCSI) interface, a fibre channel interface, a modem, a network interface, a network hub, or the like.

The interface devices 150 are capable of providing a communication gateway connection to each of the virtual peripheral devices 160. In other words, each interface device 150 "sees" each of the virtual peripheral devices 160. However, as noted above, access to certain peripheral device domains may be restricted based on the particular open system device 110–130 attempting to access the virtual peripheral devices 160.

The open system devices 110–130 communicate with the interface devices 150, and ultimately with the virtual peripheral devices 160, via communication links 170 and 175. The communication links 170 and 175 may be any type of communication links that are capable of transmitting information to and from the open system devices 110–130 and the shared virtual array 140. For example, the communication links may be fiber optic links, packet switched communication links, ESCON fibers, SCSI cable links, wireless communication links, and the like.

Although FIG. 1 represents each communication link 170 and 175 as a separate physical communication connection between the open system devices 110–130 and the interface devices 150, the invention is not limited to such an embodiment. Rather, the communication connections may be embodied, for example, as separate communication channels in the same physical communication connection. Likewise, the same physical communication connection may make use of different wavelengths or frequencies to provide separate communication links.

The routers 180 and 190 receive I/O messages from the open system devices 110–130 via the communication links 170 and route them to the virtual peripheral devices 160 via the communication links 175. Thus, as shown in FIG. 1, each open system device 110 may have a plurality of communication paths by which to reach a particular virtual peripheral device 160 in its assigned domain. Likewise, the virtual peripheral devices 160 have a plurality of communication paths by which to communicate with the open system devices 110–130. The present invention aims at balancing the workload to the virtual peripheral devices 160 across the plurality of communication paths. This concept is also referred to as path balancing.

The path balancing method of the present invention involves the open system devices 110–130 calculating the total expected connect time for all I/O messages issued to each of the peripheral devices during a predefined sampling period. The total expected connect time for all I/O messages is a function of the type of I/O messages issued. For example, the expected connect time for a "read" I/O message may be a first value while the expected connect time for a "write" I/O message may be a second value.

These totals are then added for each communication path for the sampling period to obtain path totals. The path totals are then compared to see if a difference between the highest used path and the lowest used path is greater than a threshold amount. If the difference is higher than the threshold amount, the peripheral device having a total expected connect time that is closest to a target value is moved from the highest used path to the lowest used path.

In this way, the lowest used path will receive more I/O messages while the highest used path will receive less I/O messages. Over a number of iterations, the difference between the highest use path and the lowest used path should fall below the threshold amount and the system will be well balanced.

Figure 2:
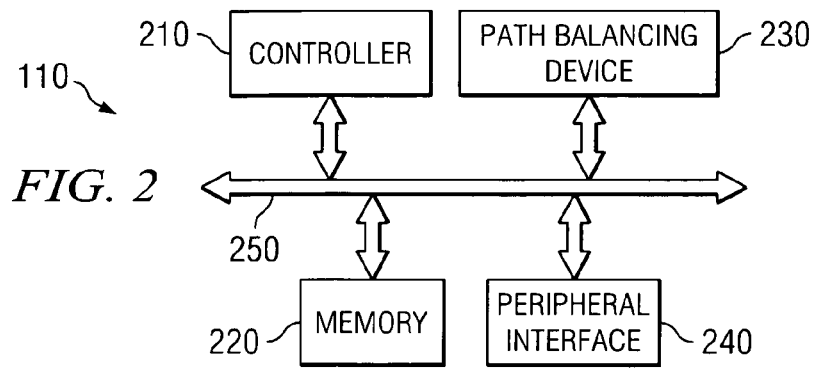
FIG. 2 is an exemplary block diagram of a system according to the present invention.

FIG. 2 is an exemplary block diagram of an open system device 110. Although FIG. 2 represents open system device 110, it should be appreciated by those of ordinary skill in the art that the other open system devices 120–130 may have similar structures and operate in a similar manner to open system device 110.

As shown in FIG. 2, the open system device 110 includes a controller 210, a memory 220, a path balancing device 230, and a peripheral interface 240. These elements 210–240 are in communication with one another via the control/signal bus 250. Although a bus architecture is shown in FIG. 2, other architectures as will be apparent to those of ordinary skill in the art, are intended to be within the spirit and scope of the present invention.

The controller 210 controls the operation of the open system device 110 based on, for example, control programs stored in memory 220. The controller 210 communicates with the virtual peripheral devices 160 over the communication links 170 via the peripheral interface 240.

The controller 210 samples the workload of each communication path over a sampling period and stores the workload information in memory 220, for example. This may be accomplished by storing the number and expected connection time for each I/O message for each virtual peripheral device 160 as the I/O message is generated by the open system device 110.

The controller 210, at predetermined time intervals, such as at the end of each sampling period, instructs the path balancing device 230 to perform a path balancing operation on the communication paths of the peripheral interface 240. In response, the path balancing device 230 retrieves the sampled workload data from the memory 230 and determines a total usage for each communication path. The total usage for a communication path over the sampling period is determined to be the total of the expected connection times for each virtual peripheral device 160 capable of being accessed over the communication path.

Once the total usage for each communication path is determined, the path balancing device 230 compares the totals to determine the highest usage communication path and the lowest usage communication path. The total usage for the highest and lowest usage communication paths are then subtracted to obtain a difference between the total usage of the highest and lowest usage communication paths.

If this difference is greater than a threshold difference, the system is determined to be unbalanced. If the system is unbalanced, the path balancing device 230 determines, based on the total usage for each virtual peripheral device 160 capable of being accessed by the highest usage communication path, which virtual peripheral device 160 to move from the highest usage communication path to the lowest usage communication path. This determination is based on which of the virtual peripheral devices 160 has a usage amount closest to a target value.

In a preferred embodiment, the virtual peripheral device 160 that is moved is the virtual peripheral device 160 whose total usage over the sampling period is closest to one half the difference between the total usage for the highest usage communication path and the total usage for the lowest usage communication path. This process is then repeated until the highest and lowest usage communication paths no longer have a difference in usage greater than the threshold usage amount.

Although the preferred embodiment uses a target value that is one half the difference between the total usage for the highest usage communication path and the total usage for the lowest usage communication path, the invention is not limited to such a target value. Rather, the target value is tuneable and may be set to any value that is appropriate for the desired functioning of the invention. Thus, the target value may be set to one third of the difference, three quarters of the difference, or any other fraction thereof. Furthermore, the target value may be independent of the difference or may be arbitrarily set.

Movement of a virtual peripheral device 160 from one communication path to another may be performed, for example, by changing the address information for the virtual peripheral device 160 in the open system device 110 or in the routers 180 and 190. Alternatively, movement may be performed physically by altering the communication links such that the virtual peripheral device 160 or the physical peripheral device 165 is connected to a different communication link.

In addition to the above, the movement of virtual peripheral devices 160 may be constrained by a movement limit set for each time interval. For example, the movement limit may be set to ½ the number of communication paths. Thus, if the number of virtual peripheral devices 160 that have already been moved in the current time interval is greater than ½ the number of communication paths, further movement of virtual peripheral devices 160 is prohibited. This movement limit is intended to prevent large numbers of virtual peripheral devices 160 from being moved and thus, causing a pendulum effect in the workload balance being shifted from one set of virtual peripheral devices 160 to another.

Additionally, the following constraints on virtual peripheral device 160 movement may be used to provide better path balancing results:
1) if there is only one virtual peripheral device 160 per communication path in a time interval, movement of virtual peripheral devices 160 is prohibited;
2) there must be more than one virtual peripheral device 160 on a communication path before one of the virtual peripheral devices 160 may be moved from the communication path;
3) each virtual peripheral device 160 may be moved only once during each time interval; and
4) if two virtual peripheral devices 160 are determined to be the best virtual peripheral device 160 to be moved, the first virtual peripheral device 160 in the set of peripheral devices 160 is chosen.

The general path balancing method performed by the path balancing device 230 described above may be represented by the following algorithm:

```
Num_moved = 0
Identify hi path and lo path
While ((hi-lo) >T1*hi&&num_moved<move_limit) {
    Target= (hi-lo)/2
    If(hi path contains device(s) with
        |value-target|<T2*target) {
            find device on hi path with smallest
            |value-target| and move this device from hi path
            to lo path
        ++num_moved
        identify new hi and lo paths
        }
    else{
        exit algorithm
        }
}
``` where hi is the largest path load, lo is the lowest path load, hi path is the communication path with the largest path load, lo path is the communication path with the lowest path load, T1 and T2 are algorithm parameters representing thresholds such that 0<T1, T2<=1, target is the target load for each communication path, num_moved is the number of virtual peripheral devices 160 that have been moved in the time interval, and num_limit is the maximum number of virtual peripheral devices 160 that may be moved in a time interval. A more detailed and extensive version of the algorithm is provided as Appendix I.

Thus, the present invention provides an apparatus and method by which the overall throughput of a multiple communication path system may be increased by balancing the workload to provide roughly equal utilization of all of the system resources. Furthermore, the invention provides a high availability environment as long as there are at least two communication paths functioning. Should a communication path fail, the path balancing method will relocate the virtual peripheral devices 160 on that communication path to one or more other communication paths, thereby reducing system downtime.

Tables 1 and 2 illustrate the benefits achieved by the present invention. Table 1 represents an unbalanced system during one time interval.

TABLE 1

Unbalanced System Device and Path Usage

| Path 1 | | Path 2 | | Path 3 | | Path 4 | |
|---|---|---|---|---|---|---|---|
| Device | Usage | Device | Usage | Device | Usage | Device | Usage |
| 1 | 20 | 2 | 15 | 3 | 40 | 4 | 20 |
| 8 | 7 | 7 | 15 | 6 | 20 | 5 | 20 |
| 9 | 7 | 10 | 7 | 11 | 15 | 12 | 10 |
|   |   | 15 | 7 | 14 | 7 | 13 | 10 |
| Total | 34 |   | 44 |   | 82 |   | 60 |

As shown in Table 1, the highest usage path is path 3 and the lowest usage path is path 1. It is assumed that the threshold difference between path usage is set to 15. The difference between the usage for path 3 and the usage for path 1 is 48 and is thus, greater than the threshold difference of 15.

The target value is equal to the difference divided by 2 and thus is 24. The virtual peripheral device associated with path 3 that has a usage that is closest to the target value is virtual peripheral device # 6. Thus, virtual peripheral device # 6 is moved from path 3 to path 1. As a result, path 1's usage is now 54 and path 3's usage is now 62.

The path balancing method is repeated and path 3 is more than 15 points higher than path 2. The target value is now 9 (Target=|62−44|/2=9). Accordingly, virtual peripheral device # 14 is moved from path 3 to path 2. The usage for path 2 is now 51 and the usage for path 3 is now 55.

Table 2 shows the same system after the path balancing method is applied. As can be seen from Table 2, the system is now balanced such that no path has a usage that is greater than 15 points higher than any other path.

TABLE 2

Same system as Table 1 after path balancing

| Path 1 | | Path 2 | | Path 3 | | Path 4 | |
|---|---|---|---|---|---|---|---|
| Device | Usage | Device | Usage | Device | Usage | Device | Usage |
| 1 | 20 | 2 | 15 | 3 | 40 | 4 | 20 |
| 8 | 7 | 7 | 15 | 11 | 15 | 5 | 20 |
| 9 | 7 | 10 | 7 | | | 12 | 10 |
| 6 | 20 | 15 | 7 | | | 13 | 10 |
| | | 14 | 7 | | | | |
| Total | 54 | | 51 | | 55 | | 60 |

Figure 3:
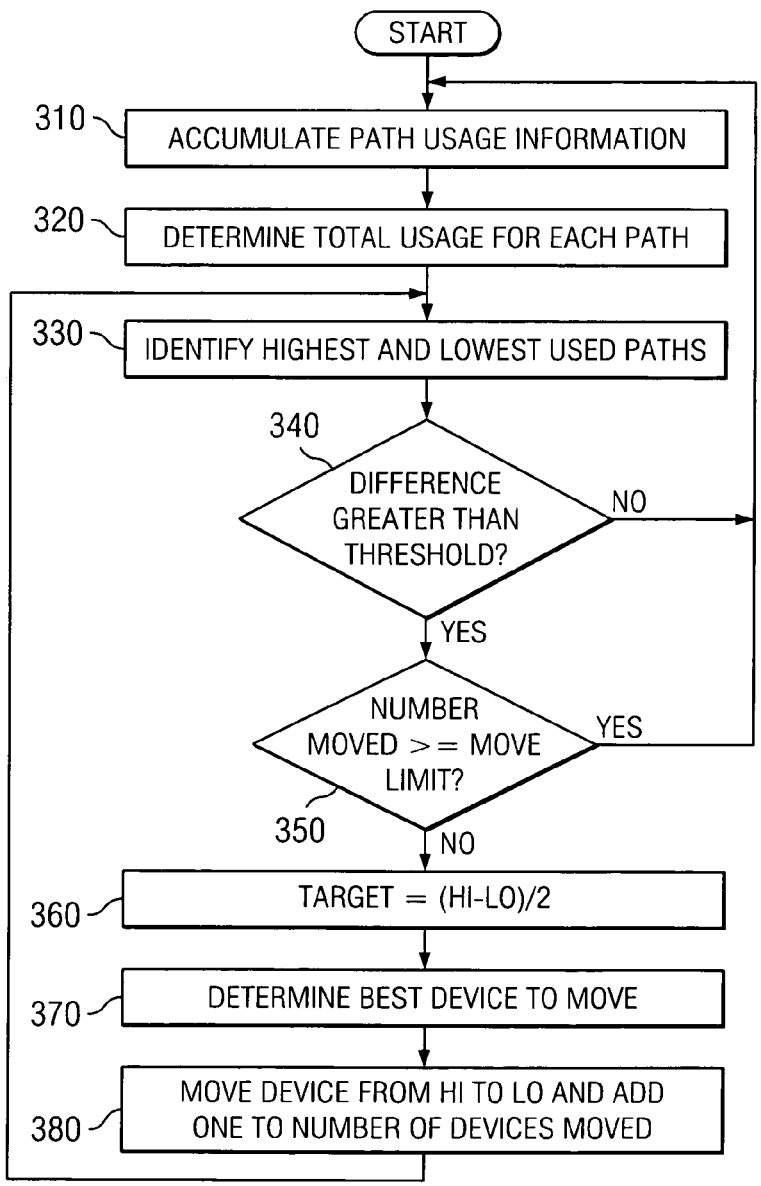
FIG. 3 is a flowchart outlining an exemplary operation of the open system of FIG. 2.

FIG. 3 is a flowchart outlining an exemplary operation of the open system device 110 according to the present invention. The process starts with the controller 210 accumulating path usage information and storing the path usage information in memory 220 (step 310). After accumulating path usage information for a predetermined time interval, the controller 110 instructs the path balancing device 230 to perform a path balancing operation starting with determining the total usage for each path (step 320).

Next, the path balancing device 230 identifies the highest and lowest used paths based on the total usage for each path (step 330). The path balancing device 230 calculates a usage difference between the highest and lowest used paths and determines if the difference is greater than a threshold amount (step 340).

If the difference is not greater than the threshold amount (step 340:NO), the path balancing device 230 determines that the system is well balanced and does not perform path balancing (returns to step 310). If the difference is greater than the threshold amount (step 340:YES), the path balancing device 230 determines if the number of moved virtual peripheral devices 160 for the time interval is greater than or equal to a move limit (step 350).

If the number of moved virtual peripheral devices 160 for the time interval is greater than the move limit (step 350:YES), the path balancing device 230 does not move any further virtual peripheral devices 160 (returns to step 310). If the number of moved virtual peripheral devices 160 for the time interval is not greater than the move limit (step 350:NO), the path balancing device 230 calculates a target usage (step 360).

Next, the path balancing device 230 determines the best virtual peripheral device 160 to be moved (step 370). In a preferred embodiment the best virtual peripheral device 160 to be moved is the peripheral device whose usage is closest to one half the usage difference. Other selection criteria for the best virtual peripheral device to be moved may be used without departing from the spirit and scope of the present invention.

After determining the best virtual peripheral device to be moved, the path balancing device 230 moves the device from the highest usage path to the lowest usage path and increments the number of moved virtual peripheral devices (step 380). The path balancing device 230 then continues the process by identifying the new highest and lowest used paths (step 330). This process is repeated until the difference between the usage of the highest used path and the lowest used path falls below the threshold amount (step 340:NO).

The above embodiments of the present invention are described with reference to a system 100 in which the I/O messages are routed by routers 180 and 190 to the interface devices 150. However, the invention is not limited to such an arrangement. The routers 180 and 190 are not essential to the functioning of the invention.

Figure 4:
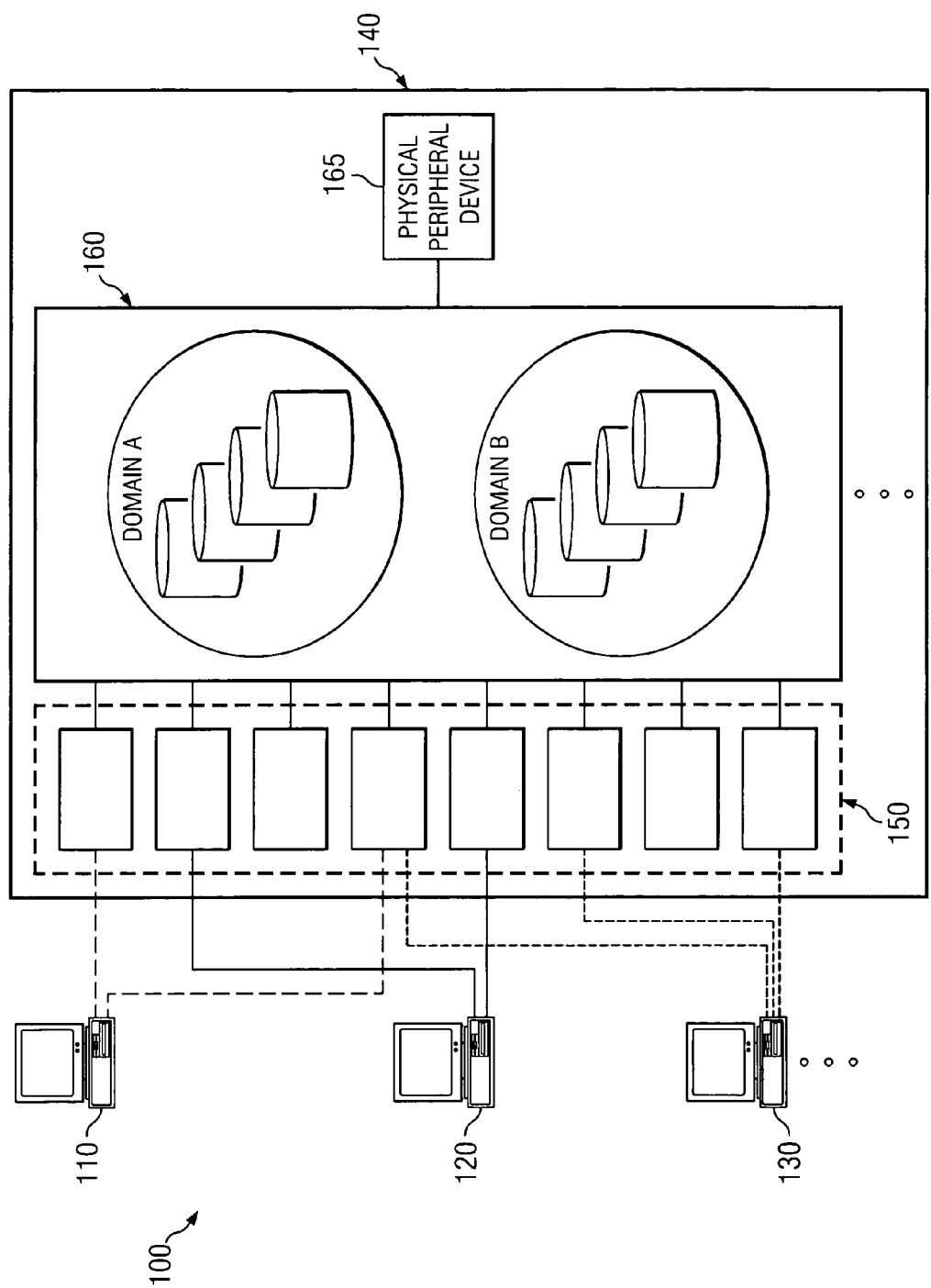
FIG. 4 is an exemplary block diagram of an alternative embodiment of the system of FIG. 1 in which the communication links are direct communication links between the open system devices and the interface devices.

As shown in FIG. 4, the system may make use of direct communication connections between the open system devices 110–130 and the interface devices 150. Each open system device 110–130 may have multiple communication connections to different interface devices 150 thereby defining a plurality of communication paths by which the open system devices 110–130 may communicate with the virtual peripheral devices 160 in their assigned domains. The path balancing method described above is equally applicable to such an embodiment of the system 100.

Figure 5:
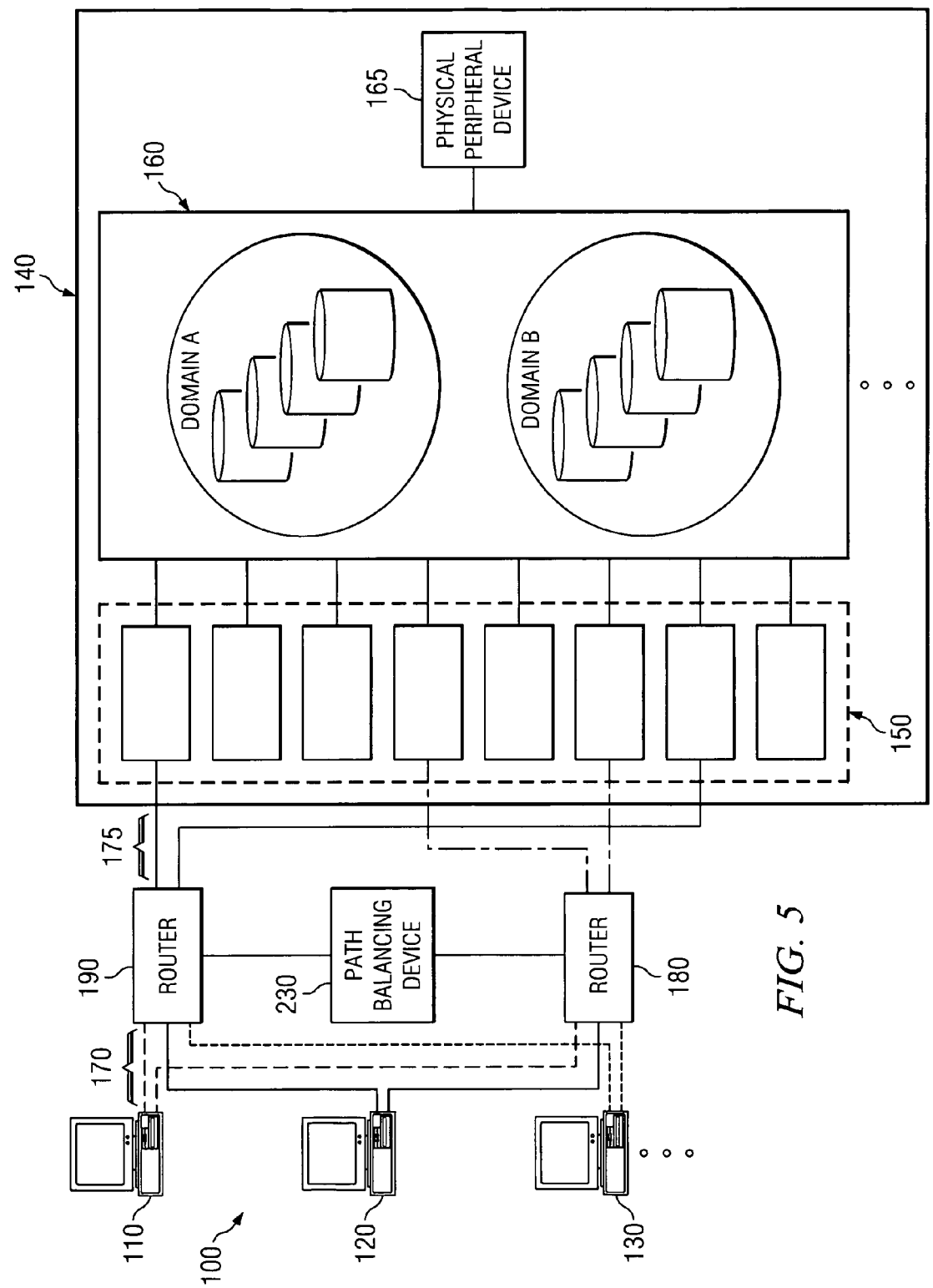
FIG. 5 is an exemplary block diagram of an alternative embodiment of the system of FIG. 1 in which the path balancing device is coupled to the routers.
Figure 6:
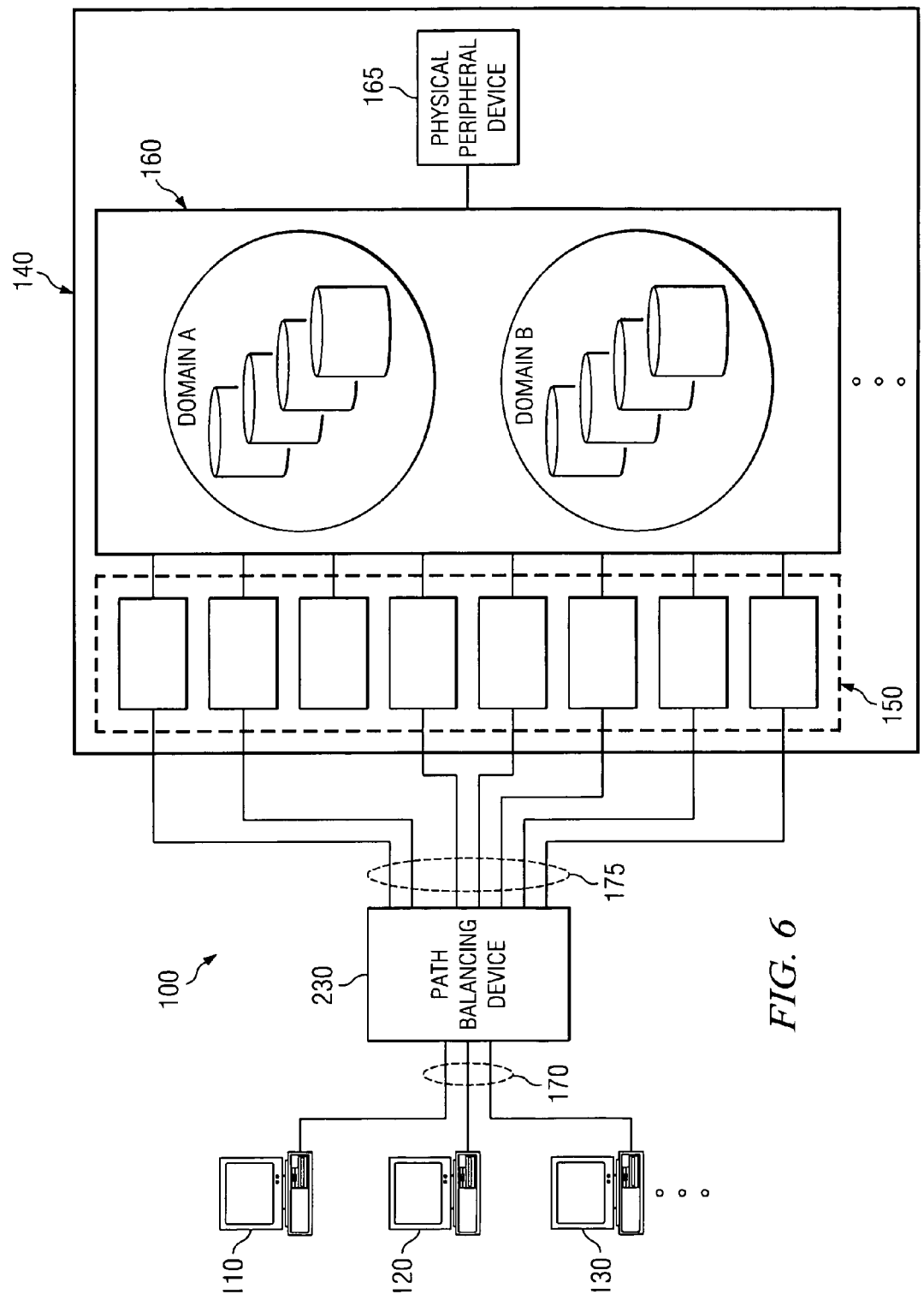
FIG. 6 is an exemplary block diagram of an alternative embodiment of the system of FIG. 1 in which the path balancing device is a centralized device; and Appendix I is an example of pseudocode for performing a method of path balancing according to the present invention.

Furthermore, while the invention has been described with reference to the path balancing device 230 being integrated into the open system devices 110–130, the invention is not limited to such an embodiment. Rather, the path balancing device 230 may be a separate device in communication with the open system devices 110–130 and the virtual peripheral devices 160. For example, as shown in FIG. 5, the path balancing device 230 may be coupled to the routers 180 and 190. Alternatively, as shown in FIG. 6, the path balancing device 230 may be a centralized device through which the communication paths pass. Other arrangements and architectures may be used without departing from the spirit and scope of the present invention.

Additionally, while the above embodiments of the invention have been described with reference to virtual peripheral devices 160, the invention is not limited to use of virtual peripheral devices. Rather, the invention may be applied to a plurality of physical peripheral devices without departing from the spirit and scope of the present invention.

As shown in FIG. 2, the method of this invention is preferably implemented on a programmed processor. However, the path balancing device 230 can also be implemented on a general purpose or special purpose computer, a programmed microprocessor or microcontroller and peripheral integrated circuit elements, an Application Specific Integrated Circuit (ASIC) or other integrated circuit, a hardware electronic or logic circuit such as a discrete element circuit, a programmable logic device such as a PLD, PLA, FPGA or PAL, or the like. In general, any device capable of implementing the flowchart shown in FIG. 3 can be used to implement the path balancing device 230 functions of this invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of balancing path usage over a plurality of paths from a first device to at least one second device, comprising:
   identifying a highest path from the plurality of paths, the highest path having a highest total path usage;
   identifying a lowest path from the plurality of paths, the lowest path having a lowest total path usage;
   calculating a difference between the total path usage of the highest path and the lowest path to form a calculated difference; and
   performing path balancing if a difference in a total path usage of a path having a highest path usage and a total path usage of a path having a lowest path usage is greater than a threshold usage amount, wherein the total path usage for each path is determined as a function of a total usage of a given path by each second device using the given path such that the path balancing is based on the total path usage of each of the plurality of paths by each second device.

2. A method of balancing path usage over a plurality of paths from a first device to a second device, comprising:
   identifying a highest path from the plurality of paths, the highest path having a highest total path usage;
   identifying a lowest path from the plurality of paths, the lowest path having a lowest total path usage;
   calculating a difference between the total path usage of the highest path and the lowest path to form a calculated difference; and
   performing path balancing if a difference in a total path usage of a path having a highest path usage and a total path usage of a path having a lowest path usage greater than a threshold usage amount, wherein the second device is a plurality of second devices, and wherein each of the plurality of second devices is associated with at least one of the plurality of paths and wherein the path balancing includes moving one of the plurality of second devices from the highest path to the lowest path based on the calculated difference.

3. The method of claim 2, wherein the second device that is moved is the second device from the plurality of second devices that has a usage amount closest to a target amount.

4. The method of claim 3, wherein the target amount is a fraction of the difference of the total path usage of the highest path and the lowest path.

5. The method of claim 1, wherein the total usage for each second device is a function of a total number of input/output messages directed to each second device multiplied by the expected connect time for the input/output messages.

6. The method of claim 5, wherein the expected connect time for the input/output messages is based on the type of input/output message being sent.

7. The method of claim 2, wherein moving the second device from the highest path to the lowest path based on the calculated difference includes changing address information for the second device.

8. A method of balancing communication path usage over a plurality of communication paths from an open system device to a peripheral device, comprising:
   calculating a total path usage for each of the plurality of communication paths;
   identifying a highest communication path from the plurality of communication paths, the highest communication path having a highest total path usage;
   identifying a lowest communication path from the plurality of communication paths, the lowest communication path having a lowest total path usage;
   calculating a difference between the total path usage of the highest communication path and the lowest communication path to form a calculated difference; and
   moving a peripheral device associated with the highest communication path from the highest communication path to the lowest communication path based on the calculated difference.

9. The method of claim 8, wherein the peripheral device that is moved is the peripheral device from the plurality of peripheral devices that has a usage amount closest to a target amount.

10. The method of claim 9, wherein the target amount is a fraction of the difference of the total path usage of the highest communication path and the lowest communication path.

11. The method of claim 8, wherein the total usage for each communication path is determined as a function of the total usage for each peripheral device associated with each communication path, respectively.

12. The method of claim 11, wherein the total usage for each peripheral device is a function of a total number of input/output messages directed to each peripheral device, respectively, multiplied by the expected connect time for the input/output messages.

13. The method of claim 12, wherein the expected connect time for the input/output messages is based on the type of input/output message being sent.

14. The method of claim 8, wherein calculating a total path usage for each of the plurality of communication paths includes sampling a number of input/output messages issued over the plurality of communication paths during a sampling period.

15. The method of claim 8, wherein moving the peripheral device from the highest path to the lowest path based on the calculated difference includes changing address information for the peripheral device.

16. A computer program product in a computer readable medium for balancing path usage over a plurality of paths from a first device to a second device, comprising:
   instructions for performing path balancing if a difference in a total path usage of a path having a highest path usage and a total path usage of a path having a lowest path usage is more than a threshold usage amount, wherein the first means accumulates a total path usage for each of the plurality of paths by sampling a number of input/output messages issued over each of the paths during a sampling period;

wherein the instructions further include:
  instructions for identifying the highest path from the plurality of paths, the highest path having a highest total path usage;
  instructions for identifying the lowest path from the plurality of paths, the lowest path having a lowest total path usage; and
  instructions for calculating a difference between the total path usage of the highest path and the lowest path.

17. A computer program product in a computer readable medium for balancing path usage over a plurality of paths from a first device to a second device, comprising:
  instructions for performing path balancing if a difference in a total path usage of a path having a highest path usage and a total path usage of a path having a lowest path usage is more than a threshold usage amount;
  wherein the instructions further include:
  instructions for identifying the highest path from the plurality of paths, the highest path having a highest total path usage;
  instructions for identifying the lowest path from the plurality of paths, the lowest path having a lowest total path usage; and
  instructions for calculating a difference between the total path usage of the highest path and the lowest path, wherein the second device is a plurality of second devices, and wherein each of the plurality of second devices is associated with at least one of the plurality of paths and wherein the second instructions include instructions for moving one of the plurality of second devices from the highest path to the lowest path based on the difference.

18. The computer program product of claim 17, wherein the instructions for moving the second device from the highest path to the lowest path based on the calculated difference includes instructions for changing address information for the second device.

19. A path balancing apparatus that balances the path usage over a plurality of paths from a first device to at least one second device, comprising:
  a controller that accumulates a total path usage for each of the plurality of paths; and
  a path balancing device that performs path balancing by identifying a highest path from the plurality of paths, the highest path having a highest total path usage; identifying a lowest path from the plurality of paths, the lowest path having a lowest total path usage; calculating a difference between the total path usage of the highest path and the lowest path; and performing path balancing if a difference in a total path usage of a path having a highest path usage and a total path usage of a path having a lowest path usage is greater than a threshold usage amount, wherein the total path usage for each path is determined as a function of a total usage of a given path by each second device using the given path such that the path balancing is based on the total path usage of each of the plurality of paths by each second device.

20. A path balancing apparatus that balances the path usage over a plurality of paths from a first device to a second device, comprising:
  a controller that accumulates a total path usage for each of the plurality of paths; and
  a path balancing device that performs path balancing by identifying a highest path from the plurality of paths, the highest path having a highest total path usage; identifying a lowest path from the plurality of paths, the lowest path having a lowest total path usage; calculating a difference between the total path usage of the highest path and the lowest path; and performing path balancing if a difference in a total path usage of a path having a highest path usage and a total path usage of a path having a lowest path usage is greater than a threshold usage amount, wherein each of the plurality of second devices is associated with at least one of the plurality of paths and wherein the path balancing device moves a second device from the highest path to the lowest path based on the difference.

21. The apparatus of claim 20, wherein the second device that is moved by the path balancing device is the second device from the plurality of second devices that has a usage amount closest to a target amount.

22. The apparatus of claim 21, wherein the target amount is a fraction of the difference between the total path usage of the highest path and the lowest path.

23. The apparatus of claim 19, wherein the total usage for each second device is a function of a total number of input/output messages directed to each second device multiplied by an expected connect time for the input/output messages.

24. The apparatus of claim 23, wherein the expected connect time for the input/output messages is based on the type of input/output message being sent.

25. The apparatus of claim 20, wherein the path balancing device moves the second device from the highest path to the lowest path based on the calculated difference by changing address information for the second device.

26. A path balancing system in which path usage over a plurality of paths from a first device to a second device is balanced, comprising:
  means for performing path balancing if a difference between a total path usage of a path having a highest path usage and a total path usage of a path having a lowest path usage is more than a threshold usage amount, wherein the first means accumulates a total path usage for each of the plurality of paths by sampling a number of input/output messages issued over each of the paths during a sampling period;
  wherein the means performs path balancing by:
  identifying a highest path from the plurality of paths, the highest path having a highest total path usage;
  identifying a lowest path from the plurality of paths, the lowest path having a lowest total path usage; and
  calculating a difference between the total path usage of the highest path and the lowest path.

27. A path balancing system in which path usage over a plurality of paths from a first device to a second device is balanced, comprising:
  means for performing path balancing if a difference between a total path usage of a path having a highest path usage and a total path usage of a path having a lowest path usage is more than a threshold usage amount;
  wherein the means performs path balancing by:
  identifying a highest path from the plurality of paths, the highest path having a highest total path usage;
  identifying a lowest path from the plurality of paths, the lowest path having a lowest total path usage; and
  calculating a difference between the total path usage of the highest path and the lowest path, wherein the second device is a plurality of second devices, and wherein each of the plurality of second devices is associated with at least one of the plurality of paths and wherein the second means moves one of the plurality of second devices from the highest path to the lowest path based on the difference.

28. The system of claim 27, wherein the second device that is moved by the second means is the second device from the plurality of second devices that has a usage amount closest to a target amount.

29. The system of claim 28, wherein the target amount is a fraction of the difference of the total path usage of the highest path and the lowest path.

30. The system of claim 26, wherein the total usage for each second device is a function of a total number of input/output messages directed to each second device multiplied by the expected connect time for the input/output messages.

31. The system of claim 30, wherein the expected connect time for the input/output messages is based on the type of input/output message being sent.

32. The system of claim 27, wherein the second means moves the second device from the highest path to the lowest path based on the calculated difference by changing address information for the second device.

* * * * *